(No Model.)
L. T. GALSTER.
PREPARATION OF BONED HAMS AND SHOULDERS.
No. 269,518. Patented Dec. 26, 1882.
FIG. 1.
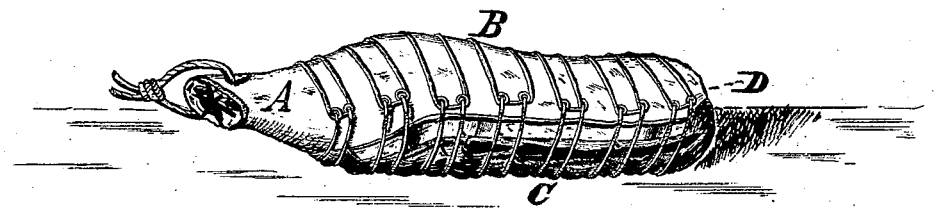
FIG. 2.
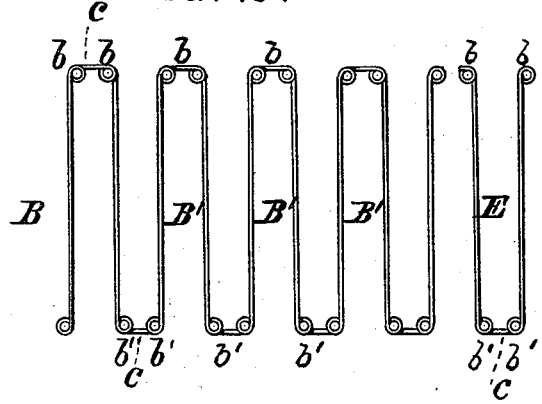
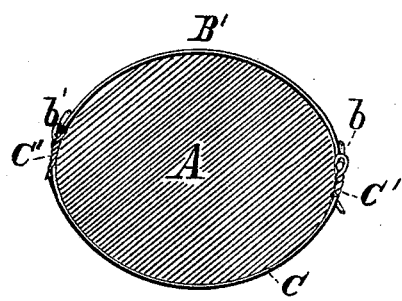
FIG. 3.
Witnesses:
M. Stark.
Willie O. Stark.
Inventor:
Louis T. Galster,
by Michael J. Stark,
Attorney.

UNITED STATES PATENT OFFICE.

LOUIS T. GALSTER, OF BUFFALO, NEW YORK.

PREPARATION OF BONED HAMS AND SHOULDERS.

SPECIFICATION forming part of Letters Patent No. 269,518, dated December 26, 1882.

Application filed November 8, 1882. (No model.)

*To all whom it may concern:*

Be it known that I, LOUIS T. GALSTER, of Buffalo, in the county of Erie and State of New York, have invented certain new and useful Improvements on a Prepared Ham, Shoulder, &c.; and I do hereby declare that the following description of my said invention, taken in connection with the accompanying sheet of drawings, forms a full, clear, and exact specification, which will enable others skilled in the art to which it appertains to make and use the same.

My present invention has general reference to improvements in bandages for putting up prepared hams and shoulders, &c.; and it consists essentially in the novel and peculiar combination of parts and details of construction, as hereinafter first fully set forth and described and then pointed out in the claims.

In the drawings already mentioned, which serve to illustrate my said invention more fully, Figure 1 is a perspective view of a prepared ham or shoulder. Fig. 2 is a plan of the metallic bandage. Fig. 3 is a sectional view through said ham or shoulder.

Like parts are designated by corresponding letters of reference in all the figures.

The object of my present invention is the production of a neat, durable, and convenient bandage for prepared hams, shoulders, &c., which can be readily applied to said meat portions of the hog.

Heretofore several methods of bandaging have been employed, one of which is to tie the meat together by means of twine surrounding the entire ham, &c., while other methods are to either pass the twine underneath the rind or to use metallic hooks in connection with twine, said hooks being arranged to engage the rind so that the bandage does not encircle the entire ham, &c., but only the fleshy portion thereof. In all but the latter method of procedure the bandage is very unsatisfactory and more or less costly; and these objections are entirely overcome by my method of bandaging.

To carry out my invention, I proceed substantially as follows: After the ham or shoulder A is "boned"—that is to say, after the bone has been removed and the ham or shoulder tightly "rolled"—I apply thereto a metallic bandage, B, consisting of a series of strands, B', having eyes $b\ b'$ and connecting-bar $c$, the bandage being composed either entire of one piece of wire, as shown in Fig. 2, or of separate U-shaped strands, as shown at E, in said Fig. 2. This metallic bandage having been applied, I proceed to tie the ham or shoulder by passing twine from the eyes $b$ on one side of the metallic bandage to the eyes $b'$ on the opposite side thereof over the meat portion of said ham, &c., the said bandage being adapted to rest upon the rind D, and the twine preferably tied securely in the eyes $b\ b'$, as shown at C in Fig. 3. It will now be readily observed that by using a bandage substantially as shown in Figs. 1 and 2 a ham or shoulder can be securely tied together in a very short space of time, and that the means shown and described form a very durable yet cheap bandage for such ham or shoulder.

Having thus fully described my invention, I claim as new and desire to secure to me by Letters Patent of the United States—

1. A prepared ham or shoulder bound by a compound metallic and twine bandage, the metallic portion resting upon the rind and the twine and wire entirely surrounding the ham or shoulder, as stated.

2. A bandage for prepared hams, shoulders, &c., consisting of a U-shaped strand of wire, E, having eyes $b\ b$ on the ends and other eyes, $b'\ b'$, at the middle portion, $c$, of said wire, and a twine portion, C, substantially as and for the object specified.

In testimony that I claim the foregoing as my invention I have hereto set my hand in the presence of two subscribing witnesses.

LOUIS T. GALSTER.

Attest:
MICHAEL J. STARK,
JOHN C. DUERR.